(12) United States Patent
Miyashita et al.

(10) Patent No.: US 7,690,803 B2
(45) Date of Patent: Apr. 6, 2010

(54) LIGHT EMITTING SHEET MODULE

(75) Inventors: Isao Miyashita, Fujiyoshida (JP);
Kenshi Aihara, Fujiyoshida (JP)

(73) Assignee: Citizen Electronics Co., Ltd.,
Yamanashi (JP)

( * ) Notice: Subject to any disclaimer, the term of this patent is extended or adjusted under 35 U.S.C. 154(b) by 0 days.

(21) Appl. No.: 11/833,764

(22) Filed: Aug. 3, 2007

(65) Prior Publication Data
US 2008/0030975 A1 Feb. 7, 2008

(30) Foreign Application Priority Data
Aug. 3, 2006 (JP) .............. P2006-211545
Mar. 6, 2007 (JP) .............. P2007-055535

(51) Int. Cl.
*G01D 11/28* (2006.01)
(52) U.S. Cl. .............. 362/27; 362/26; 362/24; 362/800; 362/615; 362/631
(58) Field of Classification Search .................. 362/26, 362/27, 800, 30, 24, 615, 631
See application file for complete search history.

(56) References Cited

U.S. PATENT DOCUMENTS

| 4,247,747 | A | * | 1/1981 | Swatten ................. 200/314 |
| 5,960,942 | A | * | 10/1999 | Thornton ................. 200/314 |
| 5,975,711 | A | * | 11/1999 | Parker et al. ............. 362/24 |
| 2007/0039809 | A1 | * | 2/2007 | Aihara et al. ............. 200/310 |

FOREIGN PATENT DOCUMENTS

JP 2004069751 3/2004

* cited by examiner

*Primary Examiner*—Sandra L O'Shea
*Assistant Examiner*—Jessica L McMillan
(74) *Attorney, Agent, or Firm*—Browdy & Neimark, PLLC

(57) ABSTRACT

A light emitting sheet module includes a light guiding sheet to cover a plurality of key switches, at least one LED disposed on at least one end portion of the light guiding sheet, and a circuit board disposed on the one end portion of the light guiding sheet on which the LED is disposed. When the light emitting sheet module is, mounted on a switch board, it is capable of adaptation to key switches in a wide variety of forms and to illuminate the key switches with light emission of high brightness.

21 Claims, 9 Drawing Sheets

LIGHT EMITTING SHEET MODULE

CROSS-REFERENCE TO THE RELATED APPLICATIONS

This application is based on and claims the priority benefit of each of Japanese Patent Application Nos. 2006-211545, filed on Aug. 3, 2006, and 2007-55535, filed on May 6, 2007, the disclosure of which is incorporated herein by reference in its entirety.

BACKGROUND OF THE INVENTION

1. Field of the Invention

The present invention relates to a light emitting sheet module which is installed in an operation panel of each of various electronic instruments and has an illumination function.

2. Description of Related Art

A sheet switch 10 as shown in FIG. 13 is used as a key inputting part installed in each of various electronic instruments such as mobile phones, mobile information terminals or the like. The sheet switch 10 achieves its illumination function through provision of a plurality of light sources including light emitting diode elements 6, each of which is disposed about each of key switches 8.

FIG. 14 illustrates a sheet switch 1 including light emitting elements 6 and a flat plate-like light guiding plate 5 (for reference, see Japanese Patent Application Publication No. 2004-69751, FIG. 9). The sheet switch 1 includes a circuit board 2 provided with a wiring pattern, fixed contacts 3 arranged on the circuit board 2, dome contacts 4 each of which works as a tact spring and is disposed on the circuit board 2 to cover each of the fixed contacts 3, the light guiding plate 5 disposed above the circuit board 2, a light emitting diode 6 (hereinafter, referred to as light emitting diode, or LED) which is a light emitting diode element or package including at least one light emitting diode element configured to illuminate one side surface of the light guiding plate 5, and key tops 7 each at the other side including an extended lower end portion which is configured to extend through the light guiding plate 5 and press each of the dome contacts 4. Light emitted from the LEDs 6 and guided in the light guiding plate 5, finally illuminates the lower end portion of each of the key tops 7 and then, the light illuminates the entire of the key tops 7.

Also known is a sheet switch which has been further thinned while retaining an illumination function for meeting a recent trend of thinning electronic instruments, (for reference, see Japanese Patent Application Publication No 2004-69751, FIG. 6). As shown in FIG. 15, the sheet switch 11 includes a circuit board 12 provided with fixed contacts 13 and dome contacts 14 each of which is disposed on the circuit board 12 to cover each of the fixed contacts 13, a light guiding plate 15 covering the area above the dome contacts 14 and the circuit board 13, and key tops 17 provided above the light guiding plate 5. Each of the key tops 17 corresponds to each of the dome contacts 14. In the sheet switch 11, light emitted from the LED 16 disposed on one end of the circuit board 12 is guided into the light guiding plate 15 to provide light emission to the entire light guiding plate 15 and illuminate the key tops 17 from below.

However, the above-mentioned conventional sheet switches face the following problems.

That is to say, in the sheet switch 10 as shown in FIG. 13, in which LEDs 6 are disposed adjacent to the key switches 8, the number of LEDs 6 must be increased as the number of key switches 8 increases. Consequently, the problem arises that power consumption is increased and the sheet switch 10 becomes large in size.

In the sheet switch 1 as shown in FIG. 14, because the light is guided to the key tops 7 through the light guiding plate 5, the number of LEDs is reduced, but in order to guide the light emitted from the LEDs 6 to the light guiding plate 5 efficiently and without leakage, a light guiding plate 5 having a certain thickness must be used. The light guiding plate 5 increasing in thickness results in increased thickness of the entire sheet switch 1.

In the sheet switch 11 as shown in FIG. 15, because the light emitted from the LED 16 enters one side surface of the light guiding plate 15 to illuminate the entire light guiding plate 15, there is a problem that brightness of the key tops at positions remote from the LED 16 is reduced and variations in brightness are noticeable throughout the entire light guiding plate 15.

Because the light guiding plate 15 is merely positioned over the circuit board 12, it is easy for a clearance to occur between the light guiding plate 15 and the sheet switch, in addition, it is easy for a clearance to occur even between the LED and the light guiding plate 15.

Accordingly, if such a clearance exists around the light guiding plate 15, there is a problem that light may leak from the clearance so that an insufficient amount of light passes through the key tops 17 and variations in brightness of the sheet switch occur.

In addition, because each of the above-mentioned sheet switches 10 and 11 including an illumination device comprising the light guiding plate and the LEDs corresponding to the key switches are integrated, it is not possible to utilize only the illumination device function. Therefore, there is a problem that the sheet switches can not be adapted flexibly to various devices in which structures of the key switches, or switch board or the like have different structures.

SUMMARY OF THE INVENTION

An object of the present invention is to provide a light emitting sheet module capable of adaptation to various forms of key switches mounted on a switch board.

Also, another object of the present invention is to provide a light emitting sheet module capable of staying in close contact with key switches and of providing light emission of the key switches with a high level of brightness, when the light emitting sheet module is installed in a switch board.

According to one embodiment of the present invention, a light emitting sheet module according to one embodiment of the present invention includes a light guiding sheet to cover a plurality of key switches, at least one light emitting diode element or light emitting diode which is a package including at least one light emitting diode element (hereinafter referred to as light emitting diode, LED) disposed in contact with at least one end portion of the light guiding sheet, and a circuit board configured to mount the light emitting diode thereon and disposed in contact with the one end portion of the light guiding sheet on which the light emitting diode is disposed.

The light guiding sheet includes a light guiding part to cover the key switches and a raised portion which is formed integrally with the light guiding part and configured to cover the LED.

The raised portion of the light guiding sheet is formed to rise smoothly and has a smoothly inclined surface, and light emitted from the LED is radially guided into the light guiding part along the inclined surface.

Dome contacts are disposed at predetermined positions of the light guiding sheet and adhered to the light guiding sheet to face predetermined fixed contacts that are disposed on a circuit board. In an example, protrusions are provided on the light guiding sheet and the dome contacts are fixed to the protrusions.

DETAILED DESCRIPTION OF THE PREFERRED EMBODIMENTS

Preferred embodiments of the present invention will be explained in detail with reference to the accompanying drawings below.

A light emitting sheet module according to a first embodiment of the present invention is explained.

Figure 1:
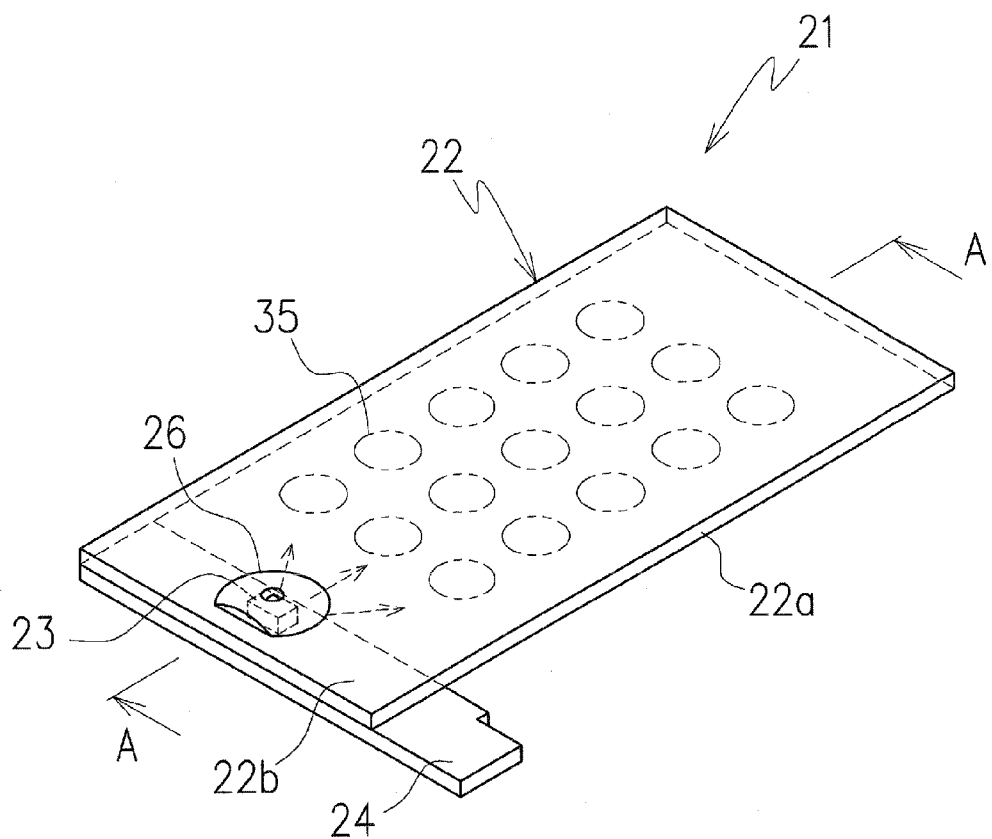
FIG. 1 is a perspective view of a light emitting sheet module according to a first embodiment of the present invention.
Figure 2:
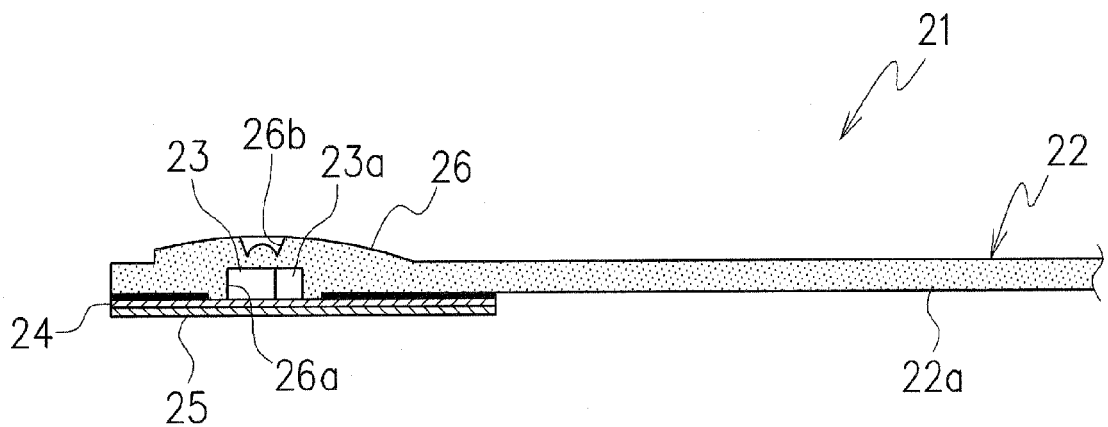
FIG. 2 is a sectional view taken along line A-A of the light emitting sheet module in FIG. 1.

The light emitting sheet module according to the first embodiment of the present invention is shown in FIGS. 1 and 2. The light emitting sheet module 21 is a thin rectangular light guiding sheet 22 including an upper surface as an emission surface, a lower surface opposite the upper surface, and a circuit board 24 (hereinafter referred to as an LED board) on which is mounted at least one light emitting diode element or light emitting diode 23 (hereinafter referred to as an LED) which is a package including at least one light emitting diode element.

The LED 23 is disposed to be at one end portion of the light guiding sheet 22, in contact with a lower surface of the light guiding sheet. The LED board 24 has an elongate shape extending along a short side of the rectangular light guiding sheet 22.

The light guiding sheet 22 comprises a transparent or translucent thin sheet which is made of, a material having good light-guiding properties such as acrylic resin, silicone resin, polycarbonate resin, polyethylene terephthalate resin or the like.

Figure 3:
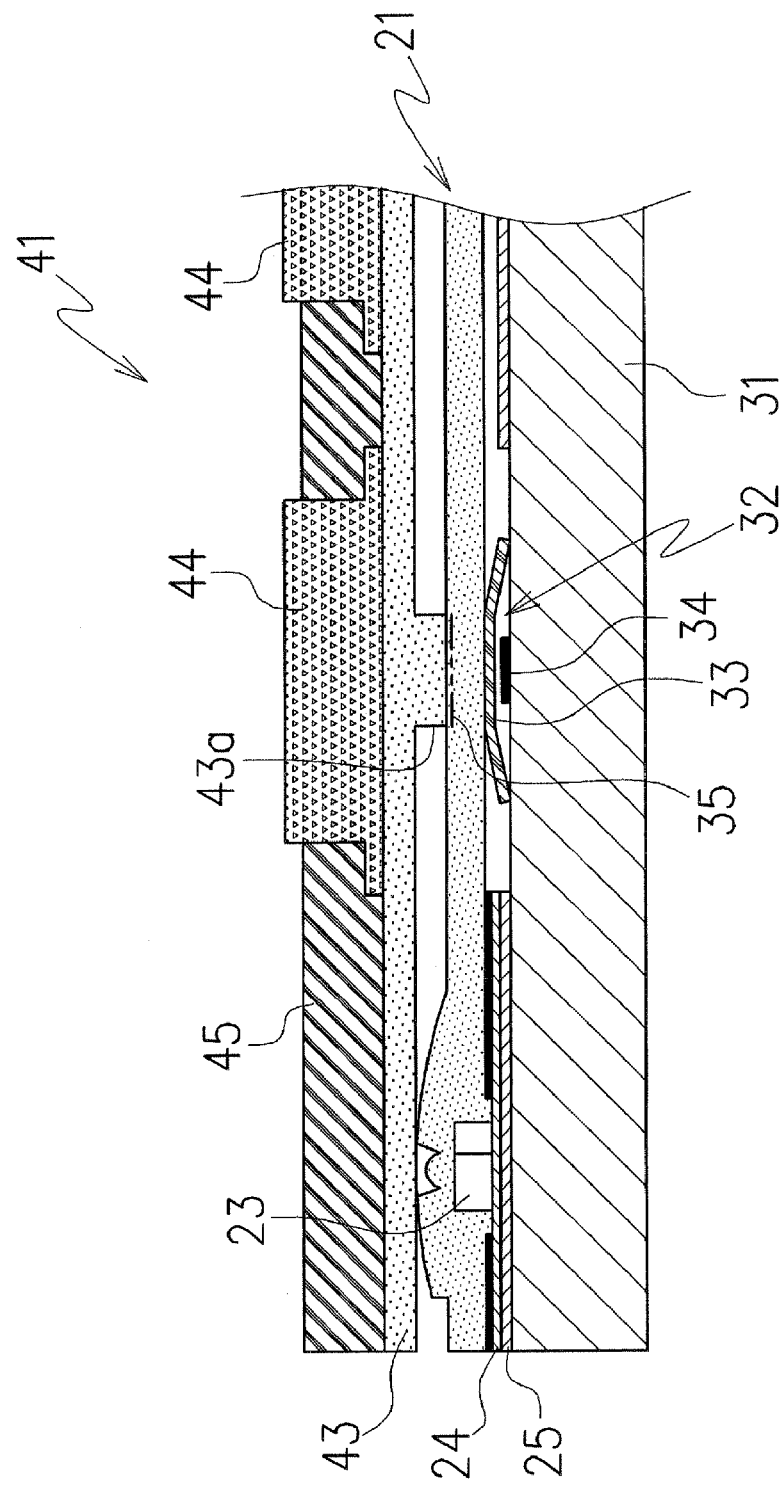
FIG. 3 is a sectional view of an operation panel in which the light emitting sheet module in FIG. 1 is assembled.

The light guiding sheet 22 includes a sheet end portion 22b under which the LED board 24 is adhered and a light guiding part 22a extending from the sheet end portion 22b in a planar state. The light guiding part 22a is designed for covering key switches 32, as shown in FIGS. 1 to 3.

In the first embodiment shown in FIG. 1, a plurality of key switches are provided on the switch board 31.

Although there is no particular limitation on the thickness of the light guiding sheet 22, it should preferably be set in the range of 0.05 mm to 0.3 mm, with a thickness of about 0.1 mm being especially desirable, in consideration of light guiding efficiency in the light guiding part 22a and desirably close contact with the key switches 32. Further explanation of the sheet end portion 22b is provided later.

In the first embodiment, the LED 23 has an emission surface 23a on a side thereof, namely it is a side light-emitting type. The LED 23 is mounted on the LED board 24 so that the emission surface 23a is disposed to face the light guiding part 22a. An upper surface of the LED 23 is in contact with and covered by a lower surface of the sheet end portion 22b (see FIG. 2).

The LED board 24 is formed as a laterally elongated member extending along a short side of the light guiding sheet 22, and the LED 23 is mounted on a substantially central portion of the LED board 24. The LED board 24 is comprised of, for example, a flexible thin circuit board. Provided on a lower surface of the LED board 24 is an adhesive surface 25 (see FIG. 2) which is to be adhered to an upper surface of the switch board 31 (see FIG. 3). It should be noted that circuit patterns (not shown) of the LED 23, connectors (not shown) to connect the circuit patterns to an outside board (not shown) and so on may be provided on the LED board 24.

The positioning of the LED 23, and, in the case that a plurality of LEDs are used, the number and arrangement of the LEDs 23, is/are suitably set according to a shape and size of the light guiding part 22a and the number of rows and columns of the key switches 32. For example, if the light emitting sheet module is formed into a rectangular sheet on which numerical keys or functional keys of a mobile phone or the like are disposed, one LED is may be disposed at the central portion of the LED board 24, as shown in FIG. 1, or a plurality of LEDs may be disposed at a regular intervals in a longitudinal direction of a laterally extending LED hoard 64 which is disposed under and along one end portion of a light guiding sheet 62, as shown in FIG. 7.

Figure 7:
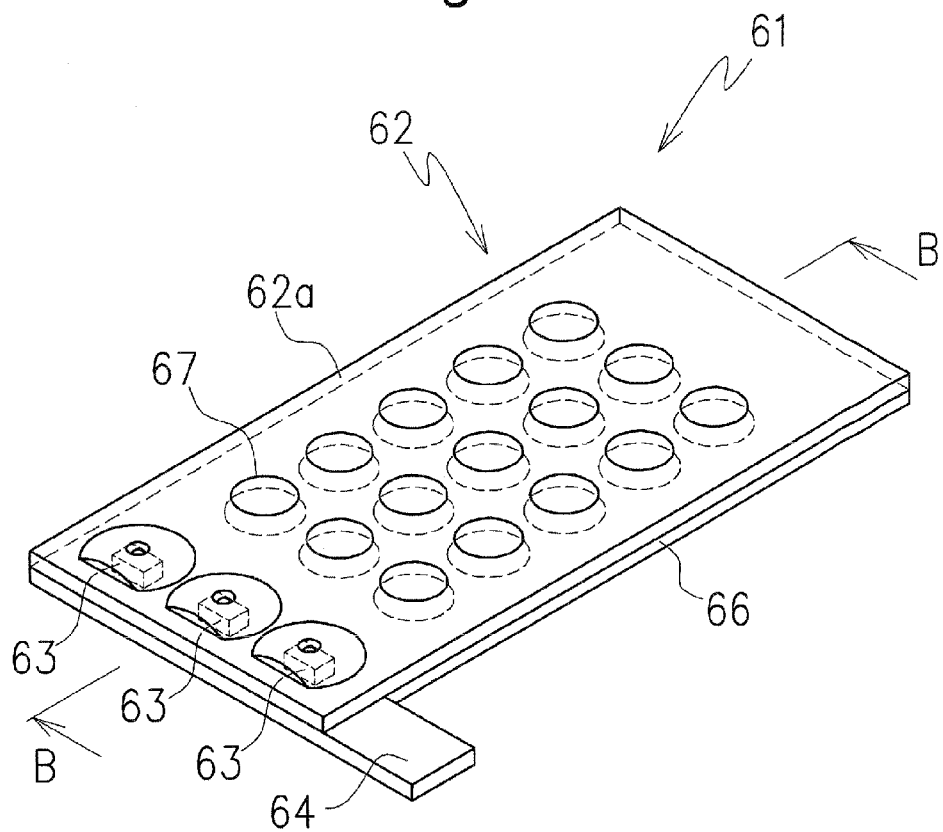
FIG. 7 is a perspective view of a light emitting sheet module including dome contacts and a removable sheet for holding the dome contacts.

As shown in FIG. 7, if three LEDs 63 including a red LED to emit red light, a blue LED to emit blue light and a green LED to emit green light are used, various colors of light can be emitted from a light guiding part 62a.

Also, if a single LED is disposed as shown in FIG. 1, a color light emitting-type LED may be used for the single LED. The color light emitting-type LED may be composed of a single color LED of such colors as white, blue or the like or a unit in which red, blue and green LED elements are integrally formed.

Next, the sheet end portion 22b of the light guiding sheet 22 covering an upper surface of the LED 23 is described in detail.

The sheet end portion of the light guiding sheet includes a raised part 26 on an upper surface thereof. The raised part 26 is configured to connect smoothly to the light guiding part 22*a*, and is formed as a substantially circular raised part covering the LED 23 by a lower surface thereof. The LED 23 is disposed under a central portion of the circular raised part. Therefore, light emitted from the emission surface 23*a* of the LED 23 radially diffuses along an inclined surface of the raised part 26 and is guided in the direction of the light guiding part 22*a*, as shown by the arrows in FIG. 1.

As shown in FIG. 2, a concave portion 26*a* of the light guiding sheet to house the LED 23 without any clearance under the raised part 26 may be provided. After the LED 23 is mounted on the LED board 24, a lower surface of the light guiding sheet 22 is disposed on the LED board 24 to make close contact therewith or to be fixed thereto through a transparent adhesive so that the LED 23 is contained in the concave portion 26*a* provided at the lower surface of the light guiding sheet. In addition, in this embodiment, a concave portion 26*b* having a convex or dome-shaped bottom surface is provided in a top portion of the raised portion 26. By providing the concave portion 26*b*, light directed upwardly from the LED 23 is reflected on the concave portion 26*b* to be guided efficiently to the light guiding part 22*a*.

In this way, the provision of the raised part 26 on the sheet end portion of the light guiding sheet 22 causes the radially emitted light from the emission surface 23*a* of the LED 23 to be guided to the light guiding part 22*a* efficiently and with a natural spread. Consequently, it is possible to illuminate the plurality of key switches disposed just below the light guiding part 22*a* with a high level of brightness and without variations. A saving in power consumption of the LED 23 can also be achieved.

A plurality of press portions 35 are provided on an upper surface of the light guiding part 22*a*, as shown in FIG. 1.

Figure 4:
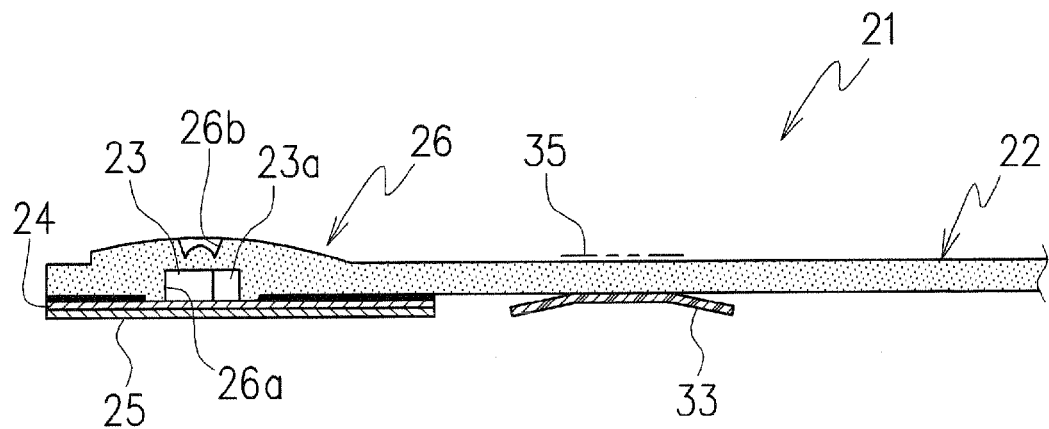
FIG. 4 is a sectional view showing dome contacts fixed to the light emitting sheet module in FIG. 1.
Figure 5:
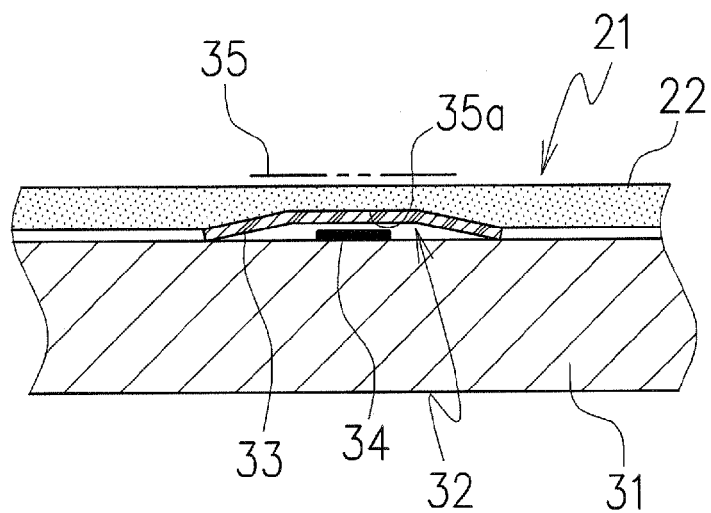
FIG. 5 is a sectional view showing the dome contacts contained in a raised portion provided on a lower surface of the light guiding sheet.

Each of the press portions 35 corresponds to a portion of the light guiding part 22*a* covering a dome contact 33 of each of the plurality of key switches 32, as shown in FIGS. 3 and 4. The light emitting sheet module 21 is integrated with the switch board 31 by placing the light emitting sheet module 21 on the switch board 31 so that the dome contact 33 is disposed to cover the area above a corresponding fixed contact 34 provided on the switch board 31. Alternatively, the dome contact 33 may be fixed in advance to a lower surface of the light guiding sheet 22 corresponding to the press portion 35 of the upper surface. Provision of the dome contacts 33 on the light emitting sheet module 21 in this way makes it easy to fix the light emitting sheet module 21 onto the switch board 31.

If an embossed concave portion is formed on a lower surface of the light guiding sheet 22 to match shape of an upper surface of the dome contact 33, it is possible to fix the dome contact 33 in the concave portion stably. Provision of the concave portion in the light guiding part 22*a* makes it possible to fit the light guiding part 22*a* closely to the key switches 32 without any clearance when the light emitting sheet module 21 is disposed on the switch board 31. Also, provision of the concave portion results in a stable holding force for the dome contact 33 when the dome contact 33 is provided in advance on the light guiding sheet 22.

The light emitting sheet module 21 may be formed as, for example, a sheet-shaped switch of an operation panel of a mobile phone.

In that case, the light emitting sheet module 21 is formed to be substantially similar to the operation panel in shape and size. The plurality of fixed contacts 34 are provided to correspond with the places where numerical keys, alphabet keys and other functional keys are disposed. Each of the dome contacts 33 is formed by a dome-shaped tact spring which is substantially flat at a central portion, made of a thin metallic material to achieve a suitable clicking sensation and disposed to cover the fixed contact 34. A mirror-like finish configured to enhance a reflection ratio is provided on an upper surface of the dome contact 33. Accordingly, light guided from the LED mounted on the LED board 24 by the light guiding sheet 22 is efficiently reflected.

Next, an explanation is given, referring to FIG. 3, of the way in which illumination of the light emitting sheet module 21 having the above-mentioned structure operates.

A current supplied from a mother board or the like through connectors (not shown) provided on the LED board 24 is applied to the LED 23. The light emitted from the emission surface 23*a* of the LED 23 is guided into the light guiding part 22*a* broadening out radially at the raised part 26 of the sheet end portion 22*b*. The light guided into the light guiding part 22*a* is guided toward the other side of the light guiding part 22*a* passing over the key switches 32 in which the dome contacts 33 are disposed.

In addition, by the reflection effect of light reflected on the dome contacts, an upper portion of each of the dome contacts 33 of the light guiding part 22*a* is particularly, brightly illuminated. In this way, because the light guiding sheet 22 is closely fitted to an upper outer shape of each dome contact 23 without any clearance, it is possible for light emitted from the LED 23 to illuminate portions of the light guiding sheet 22 corresponding to the press portions with a high level of brightness and without variations. At each of the portions where the light guiding part 22*a* is in close contact with the dome contacts 33, a mirror-like processing may be applied to an upper surface of the light guiding part 22*a*, or a mirror-like portion may be applied to the entire upper surface of the light guiding part 22*a*, or a fine concave and convex processing, any pattern processing or the like may be partially or entirely applied to the light guiding part 22*a*, and it is thereby possible to enhance reflectance or brightness in the light guiding part 22*a* due to light scattering effects.

It should be noted that the dome contacts 33 are not limited to the metallic tact springs, and that, for example, a resilient dome-shaped resinous plate formed as a tact spring by emboss processing may be used for each of the dome contacts.

In this case, each dome contact may be provided on a lower surface with an electrode for electrical conduction to the fixed contact 34 and on a front surface with a reflection surface which is formed by a coated or deposited metallic film for reflection, or by a coating material containing fine metallic particles or glass particles. By forming a reflection surface of each dome contact 33 by the above-mentioned structure, it is possible to achieve a softer clicking sensation than that of the dome contact which is entirely formed by the metallic tact spring.

As a means of efficiently guiding light in the light guiding sheet 22, especially above each of the dome contacts 33, a light reflection member or light scattering surface may be provided on a lower surface or front surface of the light guiding sheet 22. For example, by providing a light reflection member comprising a white-type or silver-type coating material on the lower surface of the light guiding sheet 22, the light guided into the light can be facilitated to illuminate the dome contacts 33 intensively, without being absorbed in the switch board 31.

In addition, by providing a large number of concave and convex light scattering parts on an upper surface of the light guiding sheet 22, it is possible to emit the light from the light guiding sheet 22 toward the press portions 35 while scattering the light by the light scattering parts. The light scattering parts can be easily formed by using a die when forming the light guiding sheet 22 and carrying out a pattern processing or the like configured to form the light scattering parts.

It should be noted that the light emitting sheet module 21 can be directly used directly used for key operation, and the press portions 35 may be formed, for example, by printing characters, symbols or the like showing various switch operations on the light guiding sheet 22 covering the dome contacts 33. Also, it should be noted that the area above the dome contacts 33 can be brightly illuminated by applying a coating material having a light shielding property to a surface of the light guiding sheet 22 excepting the corresponding portions to each of the dome contacts 33. Instead of applying a coating material a thin light shielding member with holes for corresponding portions to each of the dome contacts 33.

The light emitting sheet module 21 is placed on the key switches 32 provided on the switch board 31, as shown in FIG. 3. A key operation part is provided above the light emitting sheet module 21, thereby enabling assembly of an operation panel 41.

It should be noted that the key operation part includes a surface sheet 45 on which a plurality of thick key tops 44 are provided at predetermined positions and a rubber sheet 43 is disposed on a lower surface of the surface sheet 45.

The rubber sheet 43 comprises a thin sheet of generally the same size as the switch board 31 and having transparent or translucent portions corresponding to at least the key tops 44. In addition, as shown in FIG. 3, a downwardly and slightly projecting convex portion 43a is provided on a portion of the rubber sheet corresponding to a central portion of each of the key tops 44. The rubber sheet 43 is disposed on the upper surface of the light emitting sheet module 21 so that the convex portions 43a are in contact with the press portions 35 of the light guiding sheet 22. In order to dispose the rubber sheet 43 on the light emitting sheet module 21 stably, a spacer (not shown) for level adjustment may be provided between the rubber sheet 43 and the light emitting sheet module 21.

The surface sheet 45 constitutes a display surface of an operation panel of an electronic instrument in which the light emitting sheet module 21 is installed, and is usually formed by a soft resinous material such as rubber or the like. The surface sheet 45 is disposed to cover the area above the rubber sheet 43 and is provided with the thick key tops 44 at portions corresponding to the dome contacts 33 disposed below. Each of the key tops 44 has a light-transmitting properties and has various characters, symbols or the like printed or stamped on a surface thereof. It should be noted that the surface sheet 45 may have a light shielding property at portions excepting the key tops 44. Therefore, by providing a reflection material such as a metallic film on a back surface of each of the portions with a light shielding property, it is possible to improve the light guiding action within the light guiding sheet 22.

In the light emitting sheet module 21, light emitted from the LED 23 is guided to every corner of the light guiding sheet 22. The light guided to each of the dome contacts 33 is reflected upwardly on the shiny metallic surface of the dome contact 33. The light reflected on the dome contact 33 enters the key top 44 and passes through the rubber sheet 43, allowing the upper surface or operation surface of the key top 44 to be brightly illuminated.

As mentioned above, because the light guiding sheet 22 is in close contact with the surfaces of the dome contacts 33, there is no peripheral leakage of the light guided to the area above the dome contacts 33, and a great deal of the light can be reflected on the dome contacts in direction of the key tops 44, thus allowing the key tops to be illuminated with high brightness.

Figure 6:
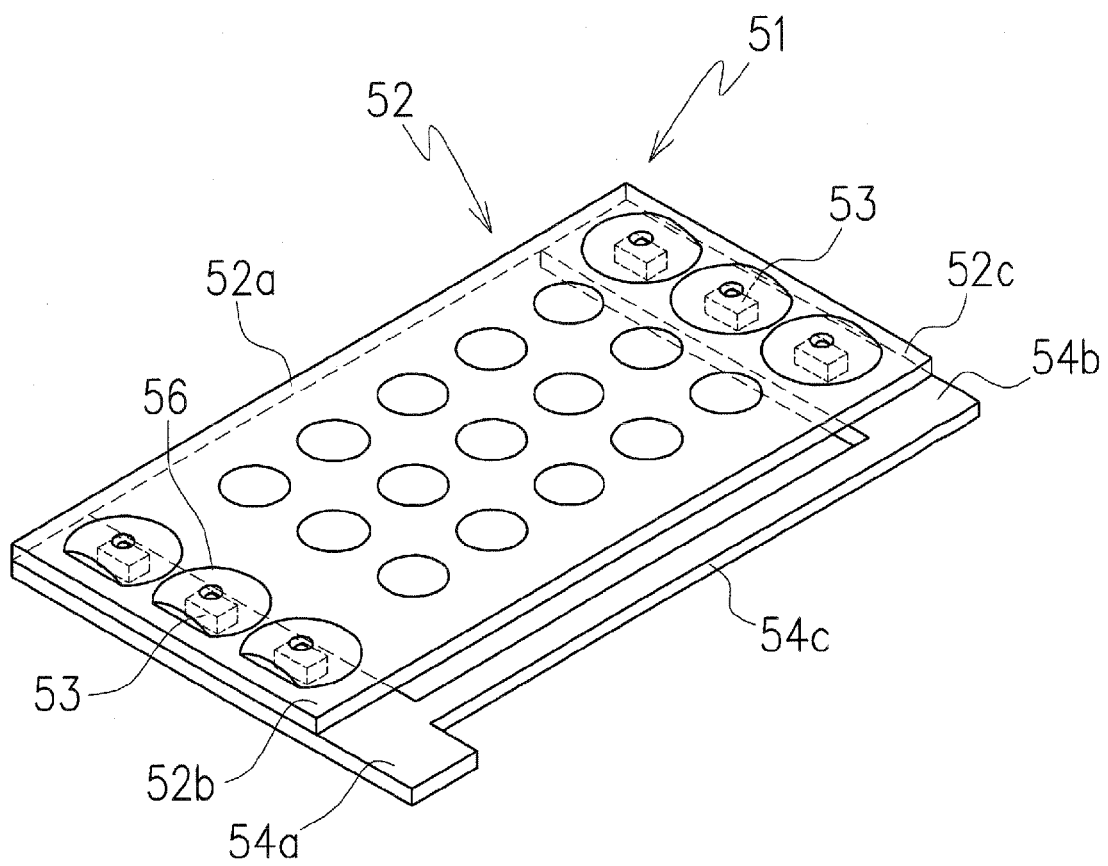
FIG. 6 is a perspective view of a light emitting sheet module according to a second embodiment of the present invention.

FIG. 6 illustrates a light emitting sheet module 51 according to a second embodiment of the present invention.

The light emitting sheet module 51 in the second embodiment includes a light guiding sheet 52 having a light guiding part 52a and a plurality of LEDs 53 disposed on opposite sheet end portions 52b and 52c of the light guiding sheet 52, respectively. The light emitting sheet module is suitable in a case that the area of the light guiding part 52a is large or in a case that a high level of brightness needs to be obtained. The LEDs 53 are mounted on a pair of LED boards 54a and 54b, and each of the LED boards 54a and 54b disposed at each short side of the light guiding sheet, covered by the sheet end portions 52b and 52c of the light guiding sheet 52. A frame is may be formed by the pair of LED boards 54a, 54b and a connecting member 54c to connect the pair of LED boards so as to avoid the light guiding part 52a, namely the connecting member 54c is disposed outside of the light guiding part 52a. In the second embodiment, three LEDs 53 are respectively arranged on the LED boards 54a and 54b which are disposed on both short sides of the light guiding sheet 52, respectively, to increase the brightness of the light guiding part, as shown in FIG. 6, but the number of LEDs 53 can be suitably changed in accordance with the size or necessary emission brightness of the light guiding part 52a.

It should be noted that because a raised portion 56 provided to correspond to an arrangement of the LEDs 53 and a position covering each of the LEDs 53 has a similar structure to the raised portion 26 in the first embodiment, a further detailed description thereof is omitted.

The light emitting sheet module 51 according to the second embodiment makes it possible to increase emission intensity at the opposite end portions of the light guiding part 52a and also obtain sufficient emission intensity at a central portion of the light guiding part, because the LEDs 53 at the opposite sheet end portions of the light guiding sheet 52 are arranged to face each other across the light guiding part 52a. Therefore, the light emitting sheet module is suitable in the case that key switches having a large shape or a large number of key switches are installed in the switch board.

Figure 8:
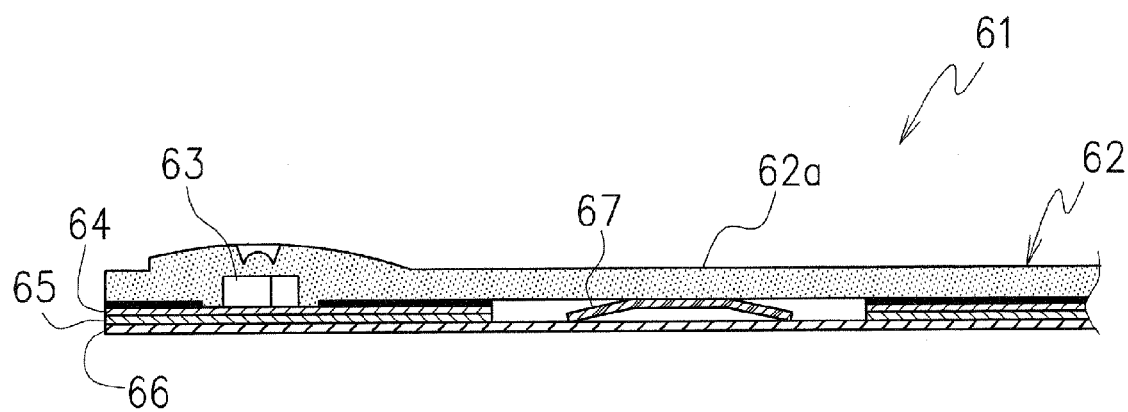
FIG. 8 is a sectional view taken along line B-B of the light emitting sheet module in FIG. 7.
Figure 9:
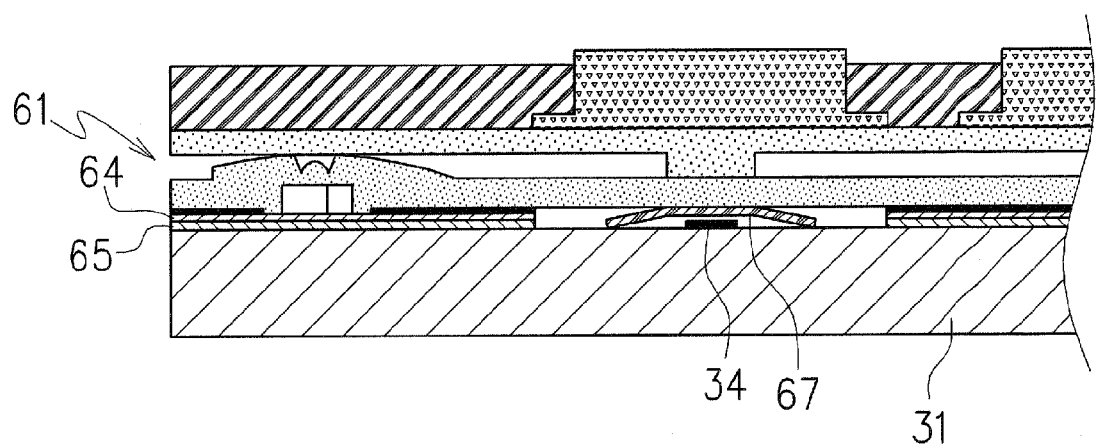
FIG. 9 is a sectional view of an operation panel in which the light emitting sheet module in FIG. 7 is assembled.

FIGS. 7 and 8 illustrate a light emitting sheet module 61 which includes a light guiding sheet 62 having a light guiding part 62a, dome contacts 67, each of which is formed by a metallic tact spring and a protective sheet 66 to hold the dome contacts 67. As shown in FIG. 9, each of the dome contacts 67 is adhered to a lower surface of the light guiding sheet 62 through an adhesive and disposed at a position corresponding to a fixed contact 34 disposed on a switch board 31 on which the light emitting sheet module 61 is mounted.

The protective sheet 66 is adhered to both a lower surface of the light guiding part 62a, where the dome contacts 67 are adhered and a lower surface of an adhesive surface 65 of an LED board 64. A surface of the protective sheet 66 facing the dome contacts 67 is formed as a removable adhesive surface. The adhesive surface of the protective sheet 66 is adhered to the adhesive surface 65 during a production process of the light emitting sheet module 61. Provision of the protective sheet 66 facilitates shipment and long-term storage of the light emitting sheet module 61.

When the light emitting sheet module 61 to which the protective sheet 66 is adhered is assembled in the switch board 31, the protective sheet 66 is removed from the light guiding sheet 62 and the LED board 64, the dome contacts 67 are aligned with the fixed contacts on the switch board 31 and thereafter adhered to the switch board 31 through the adhesive surface 65 of the LED board 64, as shown in FIG. 9.

Figure 10:
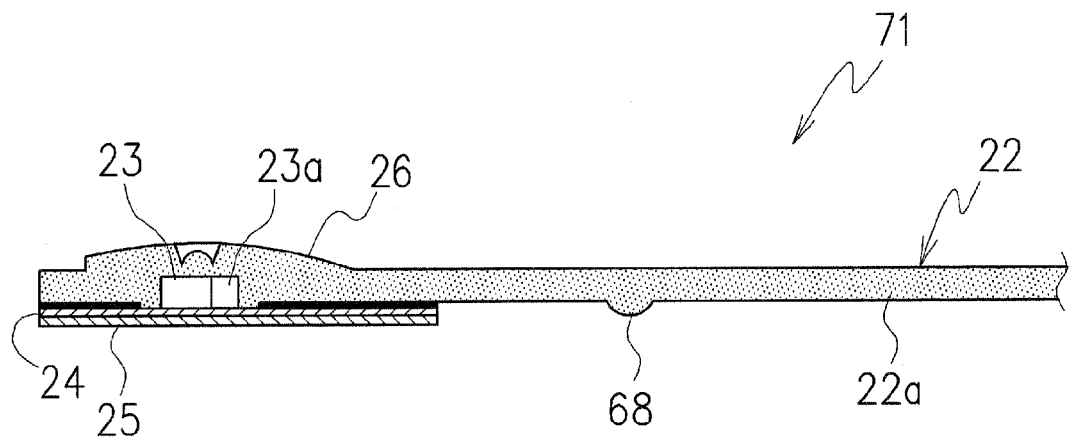
FIG. 10 is a sectional view of the light emitting sheet module including protrusions provided on a lower surface of the light guiding sheet.
Figure 11:
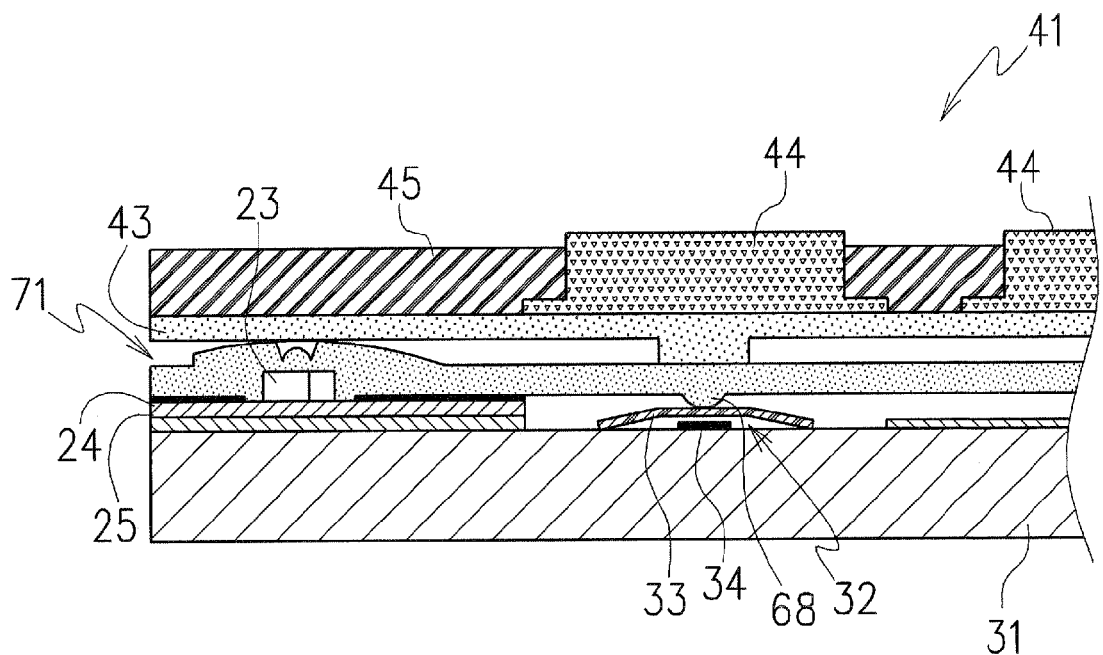
FIG. 11 is a sectional view of an operation panel in which the light emitting sheet module in FIG. 10 is assembled.

FIG. 10 illustrates a light emitting sheet module 71 including protrusions 68 each of which is provided at a predetermined position of the back surface of the light guiding sheet 22 shown in FIG. 2. Each of the protrusions 68 is formed by applying, for example, a light-transmitting resinous material to the lower surface of the light guiding sheet 22 through screen-printing or inkjet-printing, and provided at a position so as to be in contact with a substantially central portion of the corresponding key switches 32. The protrusion 68 in the illustrated embodiment is projected in a semi-spherical shape from the lower surface of the light guiding sheet, and a tip of the protrusion 68 is set to be disposed at a position corresponding to the substantially central portion of the key switches 32.

The protrusion 68 may be formed by so-called potting processing in which a light-transmitting resinous material is built up as a coating on the lower surface of the light guiding sheet 22. Furthermore, the protrusion 68 may be formed by attaching an adhesive-backed resinous molded article having a protrusion which is formed in advance according to the shape of the protrusion 68 to the lower surface of the light guiding sheet or by transferring a sheet-like protrusion onto the lower surface of the light guiding sheet 22.

By provision of the protrusion 68, the pressing point of the key switch 32 onto each dome contact is accurately fixed, leading to on improved clicking sensation and high accuracy of switching. A diameter or thickness of each of the protrusions 68 is set according to the size of the corresponding key switch 32. For example, if the diameter of the key switch 32 is 4 mm to 5 mm, it is preferable to set the diameter of the protrusion 68 to be within a range of 1.5 mm to 2.5 mm, and the thickness of the protrusion to be within a range of 75 μm in to 250 μm.

Figure 12:
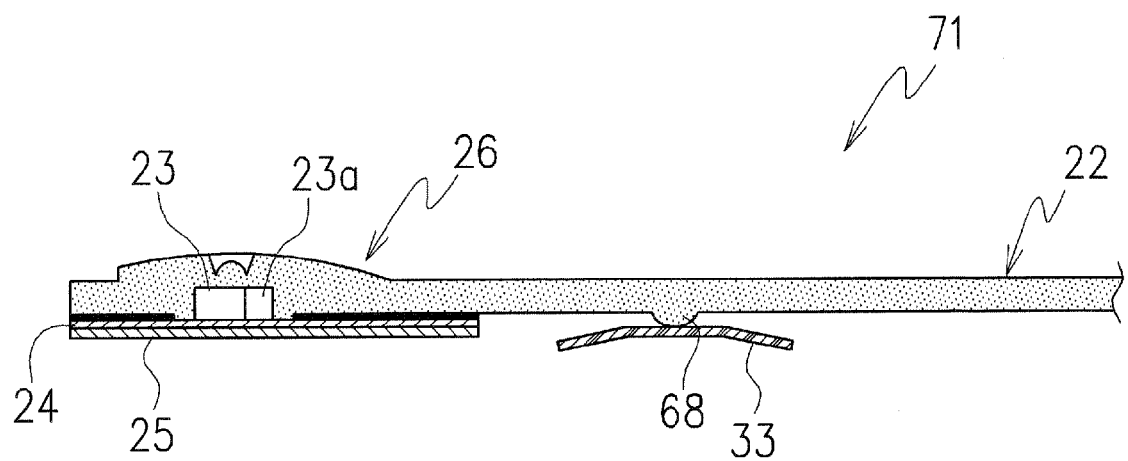
FIG. 12 is a sectional view of the light emitting sheet module including the dome contacts fixed to the protrusions provided on the lower surface of the light guiding sheet.
Figure 13:
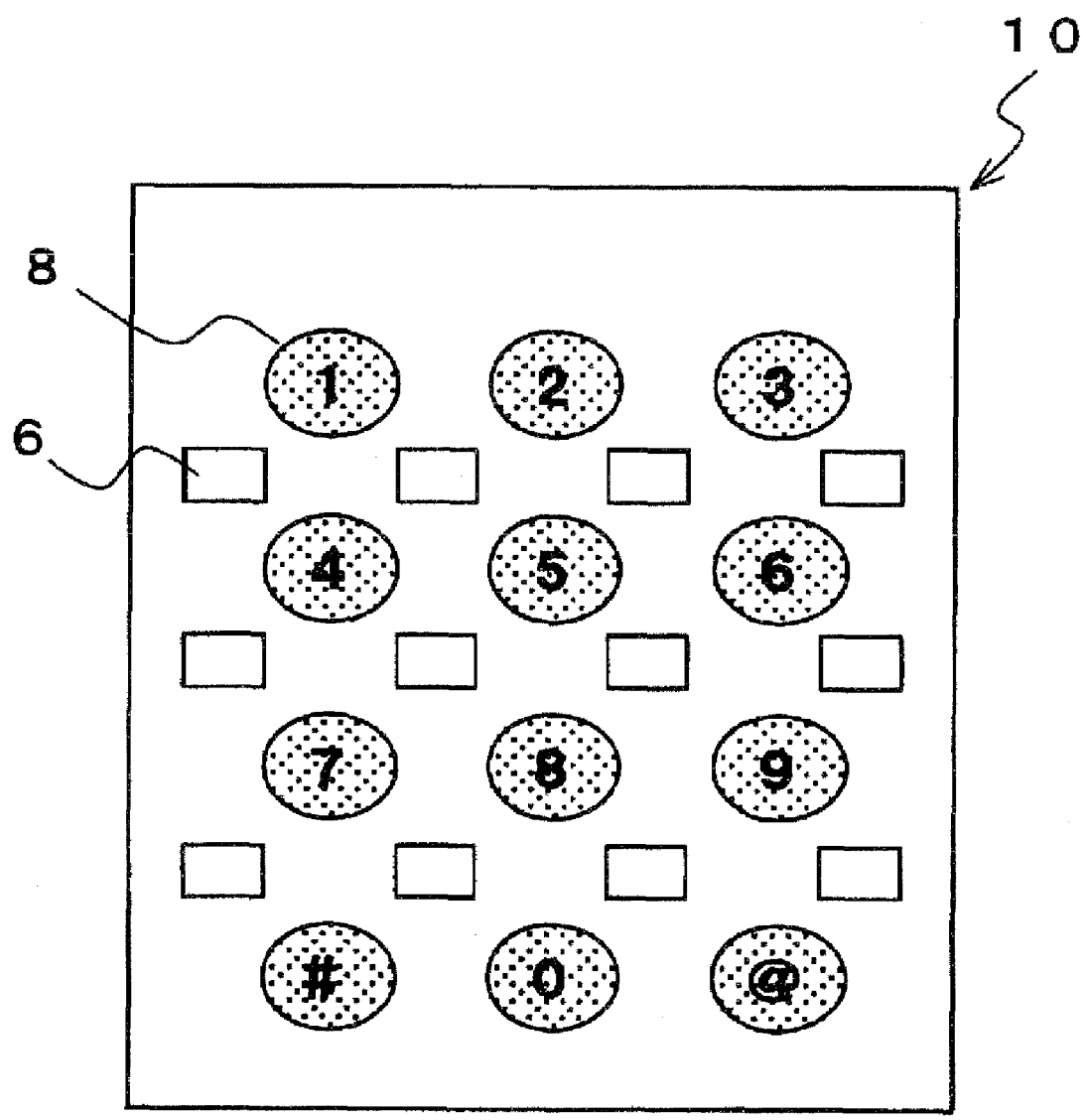
FIG. 13 is a plan view of a conventional sheet switch in which a plurality of light sources are disposed.
Figure 14:
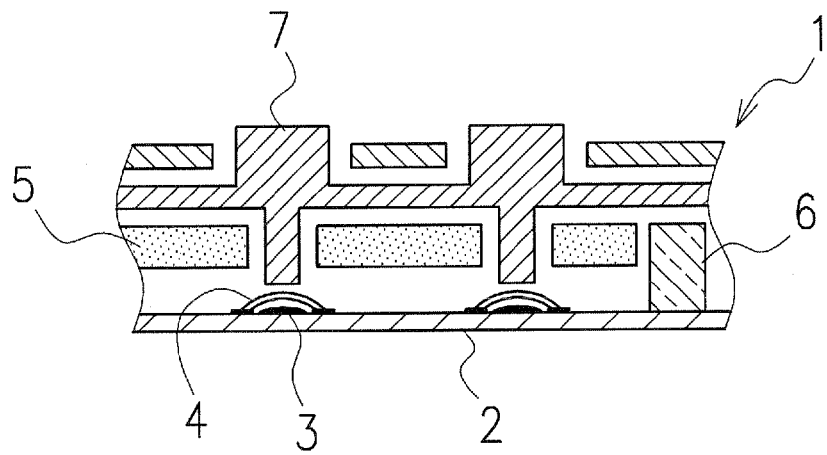
FIG. 14 is a sectional view of another conventional sheet switch including a plurality of light sources and a light guiding plate.
Figure 15:
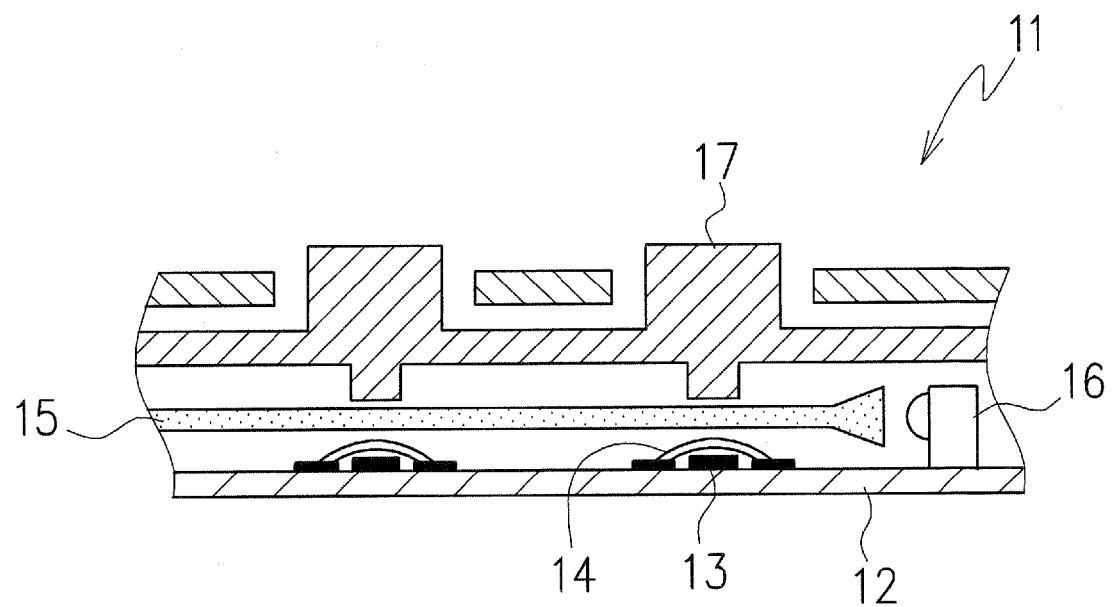
FIG. 15 is a sectional view of yet another conventional sheet switch in which a plurality of light sources are disposed to face one side of the light guiding plate.

As shown in FIG. 12, in the case that the dome contacts 33 are fixed to the protrusions 68 of the light emitting sheet module 71, the central portion of each of the dome contacts 33 is disposed to be in contact with the tip of the protrusion 68 and adhered through an adhesive or the like.

It should be noted that, even in the light emitting sheet modules 51 and 61 as shown in FIGS. 6 to 9, the same optimum clicking sensation and high accuracy of switching can be accomplished by providing the protrusions 68 to correspond to the key switches.

Because the light emitting sheet module according to the present invention includes the LED provided at the one end portion and on the lower surface of the light guiding sheet and the LED board on which the LED is mounted, and the surface of the light guiding sheet excepting the portion where the LED board is provided is opened, key switches formed on other switch boards or the like can be attached to the opened surface of the light guiding sheet. Therefore, it is possible to use with a circuit board of any material or shape for the switch board, for example, a deformable thin flexible board or hard resinous board of constant thickness. Furthermore, it is possible to install directly the switch panel in which the key switches are assembled, without being limited to the switch board.

Although the preferred embodiments of the present invention have been described, the present invention is not limited to these embodiments, and various modifications and changes can be made to the embodiments.

What is claimed is:

1. A light emitting sheet module, comprising:
a light guiding sheet to cover a plurality of key switches;
at least one light emitting diode disposed at least one end area of the light guiding sheet and in contact with a lower surface of the light guiding sheet; and
a circuit board disposed at the one end area of the light guiding sheet and the light emitting diode disposed on the circuit board;
the light guiding sheet including a light guiding area configured to cover the key switches and a raised portion formed integrally with the light guiding area at a position that covers the light emitting diode mounted on the circuit board.

2. The light emitting sheet module according to claim 1, wherein another circuit board on which at least one light emitting diode is disposed is provided at an opposite end area of the light guiding sheet.

3. The light emitting sheet module according to claim 1, wherein the light guiding area of the light guiding sheet has a thickness of 0.05 mm to 0.3 mm.

4. The light emitting sheet module according to claim 1, wherein the raised portion is formed to rise smoothly and has a smoothly inclined surface, and
wherein light emitted from the light emitting diode is radially guided into the light guiding area along the inclined surface.

5. The light emitting sheet module according to claim 1, wherein the light guiding sheet is formed by any one of acrylic resin, silicone resin, polycarbonate resin, and polyethylene terephthalate resin.

6. The light emitting sheet module according to claim 1, further comprising:
dome contacts of the key switches disposed at predetermined positions on the light guiding sheet.

7. The light emitting sheet module according to claim 6, wherein the dome contacts are adhered to a lower surface of the light guiding sheet.

8. The light emitting sheet module according to claim 6, wherein the dome contacts are held by a removable protective sheet adhered to a lower surface of the light guiding sheet.

9. The light emitting sheet module according to claim 1, wherein a plurality of light emitting diodes are disposed along a width direction of the circuit board.

10. The light emitting sheet module according to claim 9, wherein the plurality of light emitting diodes include at least a red light emitting diode element to emit red light, a blue light emitting diode element to emit blue light and a green light emitting diode element to emit green light.

11. The light emitting sheet module according to claim 1, wherein the at least one light emitting diode includes integrally formed elements configured to emit red light, blue light and green light, respectively.

12. The light emitting sheet module according to claim 1, wherein the light guiding sheet includes protrusions provided at positions facing the key switches,
wherein a tip of each of the protrusions substantially corresponds to a central position of the corresponding key switch.

13. The light emitting sheet module according to claim 12, wherein each of the protrusions is formed to project from the light guiding sheet in a generally semi-spherical shape.

14. The light emitting sheet module according to claim 12, wherein each of the protrusions is formed by printing a resinous material on a surface of the light guiding sheet.

15. The light emitting sheet module according to claim 12, wherein each of the protrusions is formed by potting processing in which resinous material is built up on a surface of the light guiding sheet.

16. The light emitting sheet module according to claim 12, wherein each of the protrusions is formed by transfer of resinous material formed according to a shape of the protrusion on a surface of the light guiding sheet.

17. The light emitting sheet module according to claim 1, further comprising:
 a switch board on which a plurality of key switches are mounted,
 wherein the circuit board on which the light emitting diode is mounted is disposed on an upper surface of the switch board.

18. A light emitting sheet module, comprising:
 a light guiding sheet including an upper surface, a lower surface opposite the upper surface, and the light guiding sheet having an end area and a light guiding area;
 at least one light emitting diode disposed at the end area in contact with the lower surface of the light guiding sheet to emit into the light guiding sheet toward the light guiding area;
 the light guiding sheet further including a raised part on the upper surface at a corresponding position where the light emitting diode is disposed.

19. The emitting sheet module according to claim 18, wherein the raised part is a substantially circular raised part covering the light emitting diode.

20. A light emitting sheet module, comprising:
 a light guiding sheet including an upper surface, a lower surface opposite the upper surface, and the light guiding sheet having an end area and a light guiding area;
 a circuit board disposed under the lower surface of the light guiding sheet;
 at least one light emitting diode disposed on the circuit board and disposed in contact with the lower surface at the end area of the light guiding sheet;
 a plurality of key switches disposed in contact with the lower surface at the light guiding area of the light guiding sheet;
 the light guiding sheet further including a raised part at a corresponding position where the light emitting diode is disposed.

21. The light emitting sheet module according to claim 20, wherein the at least one light emitting diode is further disposed at another end area of the light guiding sheet.

\* \* \* \* \*

UNITED STATES PATENT AND TRADEMARK OFFICE
CERTIFICATE OF CORRECTION

| | |
|---|---|
| PATENT NO. | : 7,690,803 B2 |
| APPLICATION NO. | : 11/833764 |
| DATED | : April 6, 2010 |
| INVENTOR(S) | : Isao Miyashita et al. |

It is certified that error appears in the above-identified patent and that said Letters Patent is hereby corrected as shown below:

At claim 18, column 11, line 24, insert --light-- after the word "emit".
At claim 19, column 12, line 4, insert --light-- before the word "emitting".

Signed and Sealed this
Thirteenth Day of September, 2011

David J. Kappos
*Director of the United States Patent and Trademark Office*